UNITED STATES PATENT OFFICE.

AUGUST BLANK AND MATTHIAS LATTEN, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

BASIC AZO DYES.

1,087,427.      Specification of Letters Patent.      Patented Feb. 17, 1914.

No Drawing.      Application filed March 13, 1913. Serial No. 754,043.

*To all whom it may concern:*

Be it known that we, AUGUST BLANK and MATTHIAS LATTEN, doctors of philosophy, chemists, citizens of the German Empire, residing at Leverkusen, near Cologne, Germany, have invented new and useful Improvements in Basic Azo Dyes, of which the following is a specification.

Our invention relates to the manufacture and production of new basic azo dyes. The process for their production consists in transforming aminoazo compounds derivable from quarternary ammonium compounds free from salt-forming acid groups, such as aminophenyltrialkylammonium chlorids of the formula:

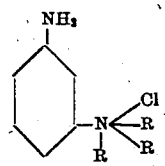

and aminobenzylpyridonium chlorid of the formula:

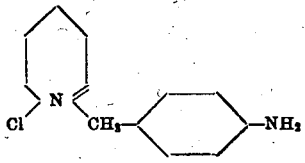

into the symmetrical diarylurea compounds by treatment with phosgen.

The new dyes are after being dried and pulverized dark powders soluble in concentrated sulfuric acid generally with a reddish coloration. They have a constitution corresponding to the formula $$(R-N=N-R'-NH)_2CO$$

in which R is the radical of a quarternary ammonium compound and R' a substituted radical of the benzene series such as the radical of cresidin, etc. Upon reduction with stannous chlorid and hydrochloric acid the ammonium compound, a diamin and carbonic acid, are obtained.

The new dyes are distinguished by the valuable properties of dyeing cotton directly in the soda alkaline bath shades fast to washing and of dyeing artificial silk fast to water in acetic acid solution.

To illustrate our process, we can proceed as follows, the parts being by weight:—37 parts of the aminoazo compound, obtained from diazotized aminobenzylpyridonium chlorid and cresidin, are dissolved in 2100 parts of hot water, 52 parts of sodium acetate are added and the liquid which must be acid (acetic acid) is filtered. Into the limpid filtrate phosgen is introduced while stirring until the production of the urea is complete. The new coloring matter is filtered off and dried. It is after being dried and pulverized a black powder soluble in cold concentrated sulfuric acid with a bluish-red coloration and soluble in water with a yellowish to orange coloration; yielding upon reduction with stannous chlorid and hydrochloric acid the aminobenzylpyridonium chlorid of the formula:

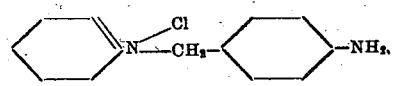

aminocresidin and $CO_2$. It has the formula:

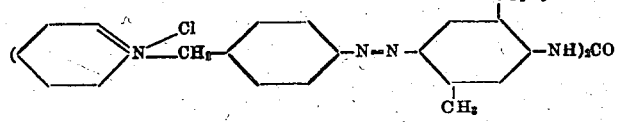

and dyes cotton and artificial silk yellow. The analogous dye obtained from 1-aminophenyl-3-trimethylammonium chlorid and cresidin has similar tinctorial properties. The dye obtained from alpha-naphthylamin dyes orange-red.

Instead of cresidin other components may be used, such as para-xylidin, meta-toluidin, meta-anisidin or the like.

We claim:—

1. The new basic azo dyes being ureas of aminoazo compounds free from salt-forming acid groups, having a constitution corresponding to the formula $$(R-N=N-R'-NH)_2CO$$

in which R is the radical of a quarternary ammonium compound and R' an aromatic radical, which dyes are after being dried and pulverized dark powders soluble in concentrated sulfuric acid generally with a reddish coloration; yielding upon reduction with stannous chlorid and hydrochloric acid a basic compound, a diamin and carbonic acid; dyeing cotton directly in the soda alkaline bath shades fast to washing and dyeing artificial silk in acetic acid solution fast to water, substantially as described.

2. The new basic azo dyes being ureas of aminoazo compounds free from salt-forming acid groups, having a constitution corresponding to the formula $$(R-N=N-R'-NH)_2CO$$

in which R is the radical of a quarternary ammonium compound and R' a methyl substituted radical of the benzene series, which dyes are after being dried and pulverized dark powders soluble in concentrated sulfuric acid generally with a reddish coloration; yielding upon reduction with stannous chlorid and hydrochloric acid a basic compound, a diamin and carbonic acid; dyeing cotton directly in the soda alkaline bath furnishing shades fast to washing and dyeing artificial silk in acetic acid solution giving dyeings which are fast to water, substantially as described.

3. The new basic azo dyes being ureas of aminoazo compounds free from salt-forming groups, having a constitution corresponding to the formula $$(R-N=N-R'-NH)_2CO$$

in which R is the radical of benzylpyridonium chlorid, and R' a substituted radical of the benzene series, which dyes are after being dried and pulverized dark powders soluble in concentrated sulfuric acid generally with a reddish coloration; yielding upon reduction with stannous chlorid and hydrochloric acid a basic compound, a diamin and carbonic acid; dyeing cotton directly in the soda alkaline bath furnishing shades fast to washing and dyeing artificial silk in acetic acid solution, giving dyeings which are fast to water, substantially as described.

4. The herein described new azo dye having most probably the formula:

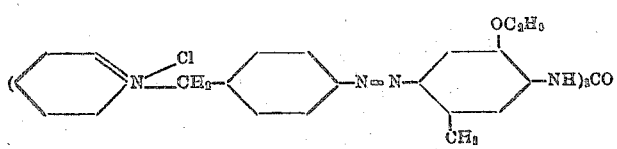

which is after being dried and pulverized a black powder soluble in cold concentrated sulfuric acid with a bluish-red coloration and being soluble in water with a yellowish to orange coloration; yielding upon reduction with stannous chlorid and hydrochloric acid aminobenzylpyridonium, aminocresidin and $CO_2$; and dyeing cotton from the alkaline bath and artificial silk yellow, substantially as described.

In testimony whereof we have hereunto set our hands in the presence of two subscribing witnesses.

AUGUST BLANK. [L. S.]
MATTHIAS LATTEN. [L. S.]

Witnesses:
HELEN NUFER,
ALBERT NUFER.